US005604268A

United States Patent [19]
Randen et al.

[11] Patent Number: 5,604,268
[45] Date of Patent: Feb. 18, 1997

[54] GLUE CRAYONS

[75] Inventors: Neil A. Randen; John W. Frank; Patrick J. Hager, all of Washington, Minn.

[73] Assignee: Minnesota Mining and Manufacturing Company, St. Paul, Minn.

[21] Appl. No.: 394,653

[22] Filed: Feb. 22, 1995

[51] Int. Cl.⁶ .......................... C09D 13/00; C08L 33/06; C08L 67/07
[52] U.S. Cl. ...................... 523/164; 526/282; 526/317.1; 526/318.4; 526/325
[58] Field of Search .................... 526/375, 318.4; 523/164

[56] References Cited

U.S. PATENT DOCUMENTS

| | | |
|---|---|---|
| 2,913,355 | 11/1959 | Collins . |
| 3,539,481 | 11/1970 | Parker . |
| 3,576,776 | 4/1971 | Muszik et al. . |
| 3,900,674 | 8/1975 | Coffman ................................. 428/355 |
| 3,929,694 | 12/1975 | Columbus . |
| 4,066,600 | 1/1978 | Fletcher et al. . |
| 4,299,741 | 11/1981 | Doehnert . |
| 4,912,169 | 2/1990 | Whitmire ................................ 525/221 |
| 5,284,690 | 2/1994 | Williams ................................... 428/40 |
| 5,331,023 | 7/1994 | Columbus ............................... 523/164 |
| 5,393,608 | 2/1995 | Chao ....................................... 428/352 |

FOREIGN PATENT DOCUMENTS

| | | |
|---|---|---|
| 0340440A2 | 11/1989 | European Pat. Off. . |
| 0562192A1 | 9/1993 | European Pat. Off. . |

*Primary Examiner*—Fred Zitomer
*Attorney, Agent, or Firm*—Gary L. Griswold; Walter N. Kirn; Carolyn V. Peters

[57] ABSTRACT

The glue crayons comprising acrylate polymers, tackified acrylate polymers, acrylate polymers containing specific, pendent, macromeric units, acrylate polymers containing high chain length alkyl (meth)acrylate monomers, acrylate polymers containing both macromeric and high chain length alkyl groups and acrylate polymers containing crystalline additives and includes (a) an acrylate-based adhesive polymer, (b) a tackifier; (c) a crystalline additive; and (d) at least one filler.

10 Claims, No Drawings

GLUE CRAYONS

TECHNICAL FIELD

This invention relates to glue crayons and in particular to acrylate-based glue crayons comprising crystallizable additives for improved storage and handling stability.

BACKGROUND OF THE INVENTION

The use of adhesives is commonplace in the art. Commonly used adhesives are available as liquids in containers, semisolid or stick forms, paste, or as solids which must be activated with water, heat or a solvent for use. Many adhesives use one or more solvents, that evaporate. Alternatively, there can be some type of curing mechanism after application to secure a bond.

Many adhesive materials require special storage conditions or packaging, for example white glue and gluesticks must be kept tightly sealed or the solvent can escape, making the adhesive unusable for future applications.

The concept for a solid adhesive stick has existed for some time, but many products are not especially user-friendly.

Some solid adhesive sticks have poor writability, minimal tack, minimal open (bonding) time, and poor adhesion properties. Other solid adhesive sticks may be difficult to apply to surfaces and can require the adhesive be applied to both surfaces being bonded and then rubbed several times with a hard object to ensure bonding or requires the use of very high pressures to bond (well above what a child or person could apply by simply rubbing with their hand or finger).

SUMMARY OF THE INVENTION

Briefly, the present invention provide glue crayons comprising acrylate polymers, tackified acrylate polymers, acrylate polymers containing specific, pendent, macromeric units, acrylate polymers containing high chain length alkyl (meth)acrylate monomers, acrylate polymers containing both macromeric and high chain length alkyl groups and acrylate polymers containing crystalline additives.

The glue crayons of the present invention are comprised the mixture of:
(a) 50–100 parts by weight of an acrylate-based adhesive polymer wherein the polymer comprises:
  i. 10 to 96 parts by weight of at least one crystalline monomeric unit having an alkyl carbon length of 18–22 carbon atoms;
  ii. 0–70 parts by weight of at least one waxy, soft monomeric unit having an alkyl carbon length of 14–175 carbon atoms;
  iii. 90–4 parts by weight of at least one tackifiying monomeric unit having a $T_m$ in the range of 100° C.;
  iv. 0–10 parts by weight of a monomeric unit having acid functionality;
  v. 0 or 0.5–20 parts by weight of a macromeric unit having an average carbon length of 18–22; and
  vi. 0 or 2.5–20 parts by weight of at least one higher alkyl chain length acrylate monomeric unit having a carbon length in the range of 30 to 50 carbon atoms;
(b) 0–50 parts by weight of a tackifier;
(c) 0–35 parts by weight a crystalline additive; and
(d) 0–50 parts by weight of a filler.

These adhesive formulations comprised of acrylate polymers, when molded into the shape of a crayon and used like a crayon, will deposit an adhesive onto a substrate. The frictional heat generated during application melts these polymers to provide a fugitive, tacky adhesive. Functional glue crayons that are both writable and will deposit a fugitive, tacky adhesive can be prepared from the base acrylate and the tackified, acrylate polymers. Functional glue crayons with improved temperature storage stability can be prepared from those acrylate polymers containing the higher chain length alkyl groups and from those acrylate polymers containing the crystalline additives. Functional glue crayons with improved writability and improved temperature stability can be prepared from those acrylate polymers containing the macromeric groups and more preferably from those acrylate polymers which contain both the macromeric groups and the higher chain length alkyl groups. In addition specific crystalline additives can be added to the tackified acrylates and the macromeric acrylates to obtain similar improved temperature stability. Glue crayons that are both functional and have higher temperature stabilities provide a significant improvement over the crayons in the background literature.

Advantageously, glue crayons of the present invention form secure bonds but do not dry out or require barrier type packaging to prevent loss of components that could lead to detrimental product performance. Furthermore, with such properties, minimal and less wasteful packaging options are available. An additional benefit is the solid form of the stick which prevents dripping and spilling and accidental application, which is common with the current forms of liquid adhesive. For glue crayons to be particularly useful, the properties of the crayon should be such that a youngster could draw or write with the glue crayon.

Glue crayons of present invention are particularly useful in school, home and office markets as a method to deliver a controlled quantity of an adhesive to a specific application site/area for light-duty, adhesion tasks with paper, cardboard, wood, craft materials, etc. The glue crayon formulations of the present invention provide an improvement over the art by providing good writability (easy application), good tackiness(finger tack), good instant adhesion (quick stick), good open time (time to form bond), and require low application pressures (simple rubbing with the hand or finger) to form a bond.

Other advantages of the present invention include: (1) no volatile organic solvent problems, such as flammability, toxicity and odor; (2) when not in use and in particular, uncapped, no dry out like the water-based glue sticks; (3) instant tack, that is, there is no waiting period for the adhesive to "dry" after application; (4) no paper substrate cockling that is sometimes seen with the aqueous based, glue stick adhesives; (5) no expensive containers required; and (6) ease of use by adults and children, alike.

As used in this application:
"crystalline monomeric unit" means monomers whose homopolymer has a $T_m$ of from about 45 to about 68° C., "open time" is the time period that the applied adhesive remains tacky enough to form a bond with another substrate;

"tacky" means sticky to the touch;

"macromer" means a telechelic polymer containing a at least one bifunctional group;

"telechelic" means a polymer or prepolymer containing one or more function end groups that have the capacity for selective reaction to form bonds with another molecule and the functionality of a telechelic polymer or prepolymer is equal to the number of such end groups.

"waxy" means monomers whose homopolymer has a $T_m$ from 25°–44° C.

DESCRIPTION OF THE PREFERRED EMBODIMENT(S)

To be effective and consumer-friendly, a glue crayon has to be easy to apply. Such an article should provide the required adhesion properties and be physically stable. The latter means that the glue crayon should not be exceedingly tacky when not being used or transfer adhesive to one's hand when being used.

Specifically, glue crayons of the present invention have the following properties. First, glue crayons have to have a melting temperature ($T_m$) above room temperature, that is, the crayon resists flowing up to temperatures of about 50° C., and preferably, above 60° C. to be a good, stable glue crayon product. Such temperatures might typically be seen in storage or transport situations. Second, glue crayons are preferably melted by frictionally generated heat when the glue crayon is rubbed on a substrate, such as paper. Third, the melted/softened adhesive readily transfers to the substrate. Fourth, this melted, transferred polymer has to wet the substrate and then function as a pressure sensitive adhesive. Fifth, the adhesive must remain tacky for a period of time in order to adhere other items thereon, that is, have acceptable "open times". During this time the adhesive has enough strength to hold the adhered items together until a more durable bond is formed by re-solidification or crystallization.

For example, when adhering paper products together, this more durable bond should tear paper or pull out paper fibers when the two adherents are pulled apart, rather than failing at the adhesive interface or cohesively. Paper tear/fiber pull would indicate that there is more than sufficient bond strength for the application.

As described the present invention is a solid adhesive stick which contains no volatile solvent that is applied by rubbing on a surface that causes frictional heating at the tip of the stick. The adhesive warms to above its melt temperature that causes it to melt and transfer to the surface by the shearing action imparted by the rubbing action.

Commercially available adhesive glue sticks use polyvinyl pyrrolidone polymers in an aqueous sodium stearate gel system. Several disadvantages of the latter include that they require an expensive container to prevent the product from drying out, they don't provide immediate finger tack during application and they often-times cockle or wrinkle paper.

Glue crayons of the present invention can be fabricated using specific acrylate polymers, tackified acrylate polymers, macromeric/acrylate polymers, acrylate polymers with high chain length alkyl groups, acrylate polymers with both macromeric and high chain length alkyl groups and these polymers with crystalline additives as the adhesive composition. Surprisingly, the copolymerization or terpolymerization of 2 or more high $T_g$ monomers produce a lower $T_g$ friction activated polymer.

The polymers used for fabricating the glue crayons can be mixed with fillers, such as pigments, and other additives, such as tackifiers. The amounts of such additional components are amount commonly used for the specific function of the component added. For illustration purposes, it is contemplated that a glue crayon within the scope of the present invention could be fabricated from a mixture of a tackified acrylate polymer, a tackifier, and a blue pigment, to produce a blue "colored" glue crayon. When there is a mixture of components used to fabricate a glue crayon, the base adhesive polymer is present in the range of 50–99 parts by weight, with the additional components making up the remainder to equal 100 parts by weight.

Useful "adhesive" polymers include those having a monomeric composition with some or all of the following units a crystalline monomer (for example, ODA):a soft, waxy monomer (for example SMA):tackifiying monomer (for example (IBOA of IBOMA):an-acid based monomer, (for example, (meth)acrylic acid):a macromeric unit (for example, octadecylacrylate):a higher alkyl chain length acrylate monomeric unit (for example, tetracontyl acrylate) (also referred to as "A:B:C:D:E:F"), wherein A is 10–90 parts by weight, B is 0–70 parts by weight, C is 90–10 parts by weight, D is 0–10 pans by weight, E is 0 or 0.5–20 parts by weight, and F is 0 or 2.5–20 parts by weight, with the provisio that the monomeric units of the polymer are equal to 100 parts by weight. As stated above, it is also permissible to use a tackifier in the adhesive composition, that is in combination with the adhesive polymer.

The polymerizable monomers used to prepare adhesive polymers are combined such that the short chain monomers typically extend along the backbone of the polymer chain, whereas the long chain components have only a small portion (the polymerizable portion) incorporated into the backbone with the majority of the chain length remaining pendent to the polymer backbone. Polymers that are particularly useful in fabricating the glue crayons typically have intrinsic viscosities (I.V.) in the range of 18–22.

The glue crayons of the present invention are comprised the mixture of:

(a) 50–100 parts by weight of an acrylate-based adhesive polymer wherein the polymer comprises:
  i. 10 to 96 parts by weight of at least one crystalline monomeric unit having an alkyl carbon length of 18–22 carbon atoms;
  ii. 0–70 parts by weight of at least one waxy, soft monomeric unit having an alkyl carbon length of 14–175 carbon atoms;
  iii. 90–4 parts by weight of at least one tackifiying monomeric unit having a $T_g$ in the range of 100° C.;
  iv. 0–10 pans by weight of a monomeric unit having acid functionality;
  v. 0 or 0.5–20 parts by weight of a macromeric unit having an average carbon length of 18–22; and
  vi. 0 or 2.5–20 parts by weight of at least one higher alkyl chain length acrylate monomeric unit having a carbon length in the range of 30 to 50 carbon atoms;

(b) 0–50 parts by weight of a tackifier;

(c) 0–35 pans by weight a crystalline additive; and (d) 0–50 pans by weight of a filler.

Polymers particularly useful in fabricating the glue crayons of the present invention include those, for example, prepared from octadecyl acrylate (ODA), stearyl methacrylate (SMA), iso-bornyl acrylate (IBOA) and methacrylic acid (MAA) or acrylic acid (AA) and the like. The glue crayons so prepared can be varied from waxy-hard crayons with low adhesion and short open times to soft, tacky crayons with long open times.

Polymers that contain lower levels of the tackifiying monomer (IBOA) and higher levels of the crystalline monomer (ODA) produce glue crayons that tend to be harder and are not generally preferred by themselves, although such a combination produces a useful glue crayon. Polymers with higher levels of the tackifiying monomer (IBOA) (10–40 weight percent) and lower levels of the crystalline monomer (ODA) (10–40 weight percent) produce more writable crayons which deposit tacky adhesives with long open times and are generally preferred. The preferred acrylate polymers have melting temperatures ($T_m$) in the range of 25°–40° C. and heats of fusion (dH) in the range of 35–55J/g, both determined via DSC.

The preferred polymers fall within the following composition range: 20–60:0–62:12–40:0–5 weight ratio of ODA:SMA:IBOA:AA and would include 33.33:46.67:20:0.5 weight ratio of ODA:SMA:IBOA:AA copolymer as a more preferred composition. Other crystalline monomers could also be used herein to demonstrate the present invention.

The performance of those acrylate polymers, mentioned above, which produced harder, less writable, crayons with melting temperatures above 39° C. could be improved by tackification. This gave glue crayons with lower melt temperatures that were softer and tackier and exhibited long open times. As above, these tackified glue crayons can be varied from hard and waxy with low adhesion to those which are soft and tacky with long open times. Of course, the starting polymer composition and tackifier dictate this. If too much tackifier is added, the adhesive compositions turn to liquids. The melting temperature of the acrylate polymers arid the desired tack are determinative of the amount of tackifier used and such amounts are typically in the range of 10% tackifier for polymers with melting temperatures of 35°–38° C., 20% tackifier for polymers with 38.1°–40° C. melting temperatures, 30% tackifier for polymers with melting temperatures of 40°–42.6° C., 40% tackifier for polymers with melting temperatures of 42.7–45 and 50% tackifier for polymers with 46°–50° C. melting temperatures etc.

Examples of the more preferred, tackified polymers would fall within the following polymer criteria: 28–60:20–60:4–20:0–5 weight ratio of ODA:SMA:IBOA:MAA with Piccolyte HM-90 as a preferred tackifier and would include: 60:20:20:0.5 wt. ratio ODA:SMA:IBOA:MAA with approx. 30 wt. % Piccolyte HM-30, preferably, a weight ratio of 44:44:12:0.5 with approximately 20 wt % piccolyte HM-90, and more preferably, a weight ratio of 28:60:12:0.5 with approximately 10 wt % piccolyte HM-90. Of course, other compositions and tackifiers could also be used herein to demonstrate the invention.

Another acrylate polymer type that is useful in the present invention as glue crayons contains macromeric unitstherein. The functionally reactive macromers are prepared from the corresponding telechelic prepolymers of, for example, octadecyl acrylate (ODA), behenyl acrylate (BeA) and mixtures of tetradecyl acrylate (TDA), tetradecyl methacrylate (TDMA), hexadecyl acrylate (HDA), hexadecyl methacrylate (HDMA), ODA, octadecyl methacrylate (ODMA), eicosyl acrylate (ECA), eicosyl methacrylate (ECMA), BeA and behenyl methacrylate (BeMA) and the like, such that the final macromer melting temperatures ($T_m$) in within the range of about 35°–70° C. and more preferably from about 45°–60° C. Macromers with calculated molecular weights of 2500, 5000, 11,000 and 20,000 g/mole for ODA and macromers of BeA with calculated molecular weights of 4500 and 11,000 have been prepared. An ODA macromer with approximately 11,000 calculated molecular weight is designated as ODA-11,000mac herein and the other macromers are designated in a similar manner respectively. The macromers are incorporated into the acrylate polymers via standard polymerization techniques for the glue crayon polymers described herein. These functionally reactive macromers include, but are not limited to the specific macromers just mentioned.

The preferred macromer/acrylate polymers have a tacky backbone, after friction activation and have pendent macromeric groups that are waxy or waxy-hard, suspended therefrom. While not intending to be bound by theory, it is believed the crystalline/waxy, waxy-hard segments reinforce the polymer by co-crystallizing between polymer chains, thus improving the writability and provide higher temperature stability to the polymer. This is demonstrated in the DSC's of these polymers in that a higher temperature peak is obtained around 47°–49° C. for the ODA macromers and around 68° C. for the BeA macromers. As the macromer content is increased, the intensity of these peaks increase. The higher stability that the macromers provide can also be demonstrated using a simple melting test in which the temperature that the polymer "melts and flows" is determined.

Examples of the more preferred macromer/acrylate polymers from a paper tearing perspective would fall within the following criteria: 4–34:39–60:14–28:0–5: 1–20 weight ratio of ODA:SMA:IBOA:AA:ODA mac and would include 32.3:46.7:20:0.5:1 wt. ratio ODA:SMA:IBOA:AA:ODA~11,000mac, 29.3:46.7:20:0.5:4 wt. ratio ODA:SMA:IBOA:AA:ODA~2500mac or ODA–20,000mac, 25.3:46.7:20:0.5:8 wt. ratio ODA:SMA:IBOA:AA:ODA~5000mac, 18.9:56.7:18.9:0.5:5 wt ratio ODA:SMA:IBOA:AA:ODA~11,000 mac and 18.3:54.9:18.3:0.5:8 wt. ratio ODA:SMA:IBOA:AA:BeA~11,000 mac as examples of the more preferred macromer/acrylate compositions. Of course other compositions and macromers could also be used herein to demonstrate the invention.

Alternatively, non-macromeric polymers, which also meet all of the glue crayon requirements and do not use macromeric monomers, can be used to fabricate the glue crayons of the present invention. It has been found that the incorporation of high alkyl chain length acrylate monomers, such as tricontyl acrylate (TrCA) (from Petrolite) with 26–34 carbon atoms in the alkyl chain, tetracontyl acrylate (TCA) (from Petrolite) with 36–44 carbon atoms in the alkyl chain and pentacontyl acrylate (PCA) (DIAX-5113 from Petrolite) with 46–54 carbon atoms in the alkyl chain, into the basic glue crayon polymers will produce adhesive compositions with excellent temperature stability. For example, inclusion of pentacontyl acrylate with octadecyl acrylate (ODA), stearyl methacrylate (SMA), iso-bornyl acrylate (IBOA) and acrylic acid (AA) result in polymers that can be molded into glue crayons with acceptable adhesions, improved writability and greatly improved temperature stability. Glue crayons prepared using such an adhesive composition are stable (defined as not flowing) up to 95°–105° C., have excellent writability and still tear paper. As before, these crayons can be varied from waxy, hard, with low adhesion to more soft, tacky crayons with long open times.

As with the macromer/acrylate polymers, the higher alkyl chain length polymers have tacky backbones after friction activation and pendent long, waxy-hard, alkyl chains. This is seen in DSC analysis of these polymers in that higher temperature peaks are obtained between 102 and 110° C. for those polymers containing pentacontyl acrylate and around 78° C. (broad peak from 50° to 95° C.) for the tetracontyl acrylate. As the content of the high alkyl monomers increased, the intensity of these DSC peaks increased. The polymer/glue crayon stability is also demonstrated by a simple melting/penetration test wherein the temperature at which the polymer melts and flows on/into paper is determined.

Examples of the more preferred, higher alkyl chain length acrylate polymers (having a carbon length in the range of $C_{30}-C_{30}$) from a paper tearing and a temperature stability perspective would fall within the following criteria: 18–22: 44–70:18–22:0–5:3–20 weight ratio of ODA:SMA:I-BOA:AA:PCA and include 20:54:20:0.5:6 wt. ratio ODA:S-MA:IBOA:AA:TrCA or PCA and 20:48:20:0.5:12 wt. ratio ODA:SMA:IBOA:AA:PCA as examples of the more preferred, high chain-length alkyl acrylate polymer compositions. Of course other compositions and higher alkyl chain length acrylate monomers could be used herein to demonstrate the invention. Typically, the percent of a higher alkyl chain length acrylate polymer needed in the polymerizable mixture is a proportional to the carbon length, that is, when the carbon length is short (less than $C_{35}$) a greater amount of this component is needed.

Alternatively, and most preferred, polymers containing both the macromer groups and the higher chain length alkyl groups can be used to fabricate the glue crayons of the present invention. It has been found that the incorporation of both of these yield glue crayons which meet all of the functional requirements and, more importantly, have improved writability and storage stability. The macromeric units and the higher chain length alkyl acrylate monomers useful herein have both been described above.

The more preferred, macromeric/higher alkyl chain length acrylate polymers from a writability, finger tack, paper tearing and a temperature stability perspective would fall within the following criteria: 7–30:30–62:10–20:0–5:9–17:4–10 weight ratio of ODA:SMA:IBOA:AA:ODAmac:PCA and includes 14.33:42:20:0.5:16.67:6 and 10:50.4:16:0.5:17:6 weight ratios of ODA:SMA:I-BOA:AA:ODA—11,000mac:PCA as examples of the more preferred compositions.

Crystalline additives with varying functionality such as acids, diacids, alcohols, diols, waxes, etc. based on linear hydrocarbons can be added to the acrylate polymers to provide higher temperature stability to the glue crayons where needed.

Crystalline additives are melt miscible with the acrylate polymers (form a transparent single phase system when molten) and upon cooling, they partially or completely crystallize and form finely dispersed phases in the polymer. This is thought to reinforce the acrylate copolymer without damaging the polymer's cohesive strength. The additive/polymer blends exhibit rapid set-up time due to the additive; for example when poured from a 120° C. melt, the blend becomes opaque within seconds and solidifies within minutes.

Crystalline additives provide improved storage stability (i.e., resistance to creep and flow) to the polymers up to the melting point of the crystalline additives. Moderate levels of 3 to about 35 wt. % of the additives do not spoil adhesion and may in fact tend to accelerate re-crystallization by acting as nucleating agents. Higher loading levels reduce adhesion and cause bond failure.

To be useful herein, the additives crystallize (at least partially) from the base polymer. The additives have an n-alkyl chain length of at least 20 carbons and preferably at least 22 carbon atoms, if mono-functional and they have a melting point of at least 50° C. and preferably at least 70° C.

A partial list of useful crystallizable additives include, for example:

| Crystalline Additive | No. of C-Atoms[1] | Functionality | Source |
|---|---|---|---|
| Behenyl Alcohol | 22 | Linear Alcohol | VISTA Nacol 22-98 (Vista Chemical) |
| Behenic Acid | 22 | Linear Acid | PRIFRAC 2987-1 (Unichema) |
| Stearic Acid | 18 | Linear Acid | 3M RM |
| Stearyl Alcohol | 18 | Linear Alcohol | VISTA Alfol C-18 |
| Zinc Stearate | 18 | Carboxylate Salt | Aldrich |
| Calcium Stearate | 18 | Carboxylate Salt | |
| Tricontyl Alcohol | 30 | Mixed Alcohol | UNILIN-425 (Petrolite) |
| Tetracontyl Alcohol | 40 | Mixed Alcohol | UNILIN-550 (Petrolite) |
| Pentacontyl Alcohol | 50 | Mixed Alcohol | UNILIN-700 (Petrolite) |
| Microwax | | Microcrystalline | BE-SQUARE 185,195 (Petrolite) |
| Hydroxystearic Acid | 18 | Alcohol, Acid | 12-HSA (Condor) |
| Glycerol Tribehenate | 22 | Triglyceride | Synchrowax-HC (Croda) |
| C-24/28 α-Olefin | 24/28 | 76% + n-α Olefin | Gulftene (Chevron) |
| C-30+ α-Olefin | 30+ | 76% + n-α Olefin | Gulftene (Chevron) |
| Azelaic Acid | 9 | Dicarboxylic Acid | Emerox (Henkel) |
| Telechelic Polymers: | | | |
| ODA | 18 | Fatty Ester | 3M |
| BeA | 22 | Fatty Ester | 3M |

[1]straight chain

The 40 and 50 carbon length, primary, linear, fully saturated alcohols are particularly effective. Compared to the corresponding linear waxes, the alcohols are more miscible with the more polar acrylate polymers. The alcohol blends have better adhesion than wax blends.

Telechelic polymers (non-functionalized) and macromeric polymers, which have been described previously, can also be added to the acrylate polymers of this invention as additives; they don't have to be polymerized into the polymer backbone to provide a benefit. As additives, they provide increased writability and improved temperature stability to the resultant glue crayon polymers. However, in some instances the covalently bonded macromers do seem to be a little better. The telechelic and macromeric units may be homopolymeric or copolymeric with $T_m$'s between 40°–65° C. Their melting/flow temperatures control their usefulness in that they provide stability and cohesive strength to the base acrylate polymers. Compatibility of these telechelic polymers with the base acrylate glue crayon polymers can be controlled and improved when the co- and higher telechelic polymers are used.

Fillers such as calcium carbonate, silica, bentonite clays, glass spheres and bubbles, wood flour etc. can be readily mixed into the glue crayon polymers by melt mixing. Colorants such as dyes, pigments etc. can be used as desired. Anti-oxidants can be used to reduce off coloration of the polymers during the heat processing. Overcoats, such as the fillers just mentioned or other materials such as higher melting acrylate polymers or copolymers and the like, with $T_m$'s greater than 38° C., paper, paper liners, plastic films etc. may be used to reduce any perception of tack that may be experienced due to the characterics of the glue crayon polymer. The overcoat may enhance the overall (breaking) strength of the crayon, defined as resistance to fracture when placed in a flexural stress. The amounts of such fillers are amounts effective to produce the effects commonly associated with such fillers.

Additionally, tackifiers could be mixed with the polymer and include any such tackifiers known to those skilled in the art, for example, wood rosins, wood rosin esters, turpenes, and the like. Optionally, solid or encapsulated materials such as plasticizers or tackifiers could also be added.

The glue crayons of this invention would find utility in school, home and office markets as a method to deliver a controlled quantity of an adhesive to a specific application site/area for light-duty, adhesion tasks with paper, cardboard, wood, craft materials, etc.

The features and advantages of the present invention are further illustrated by the following examples, but the particular materials and amounts thereof recited in these examples, as well as other conditions and details, should not be construed to unduly limit this invention. All materials are commercially available or known to those skilled in the art unless otherwise stated or apparent.

Glossary

| | |
|---|---|
| ODA | octadecyl acrylate |
| SMA | stearyl methacrylate |
| IBOA | iso-bornyl acrylate |
| IBOMA | iso-bornyl methacrylate |
| MAA | methacrylic acid |
| AA | acrylic acid |
| ODA-mac | octadecyl acrylate macromer |
| BeA-mac | behenyl acrylate macromer |
| PCA | Pentacontyl Acrylate (commercially available from Petrolite Chemical) |
| TCA | Tetracontyl Acrylate (publicly available from Petrolite Chemical) |
| TrCA | Tricontyl Acrylate (publicly available from Petrolite Chemical) |
| VAZO-64 | 2,2'-Azobisisobutryronitrile |
| ACl | Acryloyl Chloride |
| MACl | Methacryloyl Chloride |
| IEM | 2'Isocyanatoethyl Methacrylate |
| IPDMBI | 3-isoPropenyl-alpha,alpha-Dimethyl Isocyanate |
| DBTDL | Dibutyl Tin Dilaurate |
| ME | Mercaptoethanol |
| $N_2$ | Nitrogen |
| EtOAc | Ethyl Acetate |
| PEMP | Pentaerythritol Mercaptoproprionate |
| DSC | Diferential Scanning Calorimeter |
| dH | Heat of Fusion |
| I.V. | Inherent Viscosity |
| IOTG | isooctylthioglycolate |

TEST METHODS

Subjective Evaluations (1) Writability was defined as the ease of deposition of the adhesive onto a substrate and was rated on a scale of 1 to 5 with 5 being the most writable, that is, theeasiest to apply. For a 3 rating, the crayon deposited adhesive completely across the area of application with a single stroke. A 4 or 5 rating indicated higher levels of adhesive deposition. The glue crayon was held and used as one would use a crayon to deposit the adhesive onto a paper substrate. (See Objective Evaluation 1 below)

(2) Finger tack of the deposited adhesive was determined immediately after application and was rated on a 1 to 5 scale with a rating of 5 being the most aggressive.

(3) Open time was the time that the adhesive remains tacky, could also be assessed along with writability and finger tack.

(4) Tear paper was the inherent strength of the adhesive polymer. It was determined by a couple of different proceedures as follows:

(a) In the first method adhesive, deposited as described in 1, above, was melted for 45 seconds in a 70° C. oven. The sample was removed and the paper folded over onto the adhesive and pressed together. After approximately, five minutes the paper was slowly separated and any paper tear/fiber pulling observed.

(b) In the second method, adhesive was rubbed onto a paper substrate as described in 1 above. A 1.26×10 cm strip of paper was then placed over the deposited adhesive and pressed down with finger pressure. Bond strength was evaluated subjectively by slowly pulling the adhered paper strip back on itself at an 180° angle and was assessed as to whether or not it tore the paper. If it tore the paper, the paper that tore was compared to the total applied adhesive area and the percentage of torn paper was recorded. If it did not tear the paper, the bond strength was rated on a 1 to 5 scale, with 1 indicating that the adherent had enough bond strength to adhere two pieces of substrate together, but weak enough to separate with little force. A rating of 5 indicates the bond was strong enough to almost tear paper. Testing time intervals, such as 1-hour, 1-day, 1-week etc. and testing temperature, such as 70° F., 80° F., 90° F. etc. could be varied to reflect different climatic environments.

(c) A third method consisted of applying the crayon adhesive, as described in 1 above, to one end of a 1.26 ×12.5 cm strip of heavy construction paper and bonding this end to the opposite end to form a paper ring. The bond was pulled apart at a specified interval to assess bond strength.

Objective Evaluations (1) Writability was defined by the amount of adhesive deposited onto paper in 5 cycles with an A.A.T.C.C. Crockmeter (model CM-5). The head of the Crockmeter weighs 0.9 kg (2 lbs.) and a jig was used to hold the 1.3 cm (½ in.) diameter crayon that had been cut at a 45° angle prior to testing. The crayon tip was aligned in the jig so that the 45° cut was perpendicular to the direction of travel.

(2) 90° Degree Peel Adhesion were determined in the constant temperature/humidity room (22° C./50% R.H.). The adhesive was applied, as described above, with the Crockmeter onto a 2.53 cm(1 inch) wide paper strip. Another strip of paper was immediately placed over the first and rolled with a 2.2 Kg weight. The peel adhesion on the Sintec System 1 Computerized Systems for Material Testing was started 2 minutes after the adhesive had been applied, with a jaw speed of 30.4 cm/min.

(3) Open times were determined by applying the adhesive to paper with the Crockmeter, as described above and then adhering strips of paper thereon, at various time intervals with finger pressure only. After setting 10 minutes, the strips were removed and evaluated for fiber transfer to the adhesive from the top strip of paper. "Open time" was defined as the time that the deposited adhesive would tear.

(4) Differential Scanning Calorimeter (DSC) was use to determine melting points and heats of fusion. The test was run by cooling a 5 to 10 mg sample to-40° C. and then heating at 10° C./min. to 100° C. or 110° C. (depending on the particular test sample on a DSC 2910 Differential Scanning Colorimetric (DuPont Instruments). (5) High- Temperature Crayon Stability was determine as follows: approximately 1 mm×1.3 cm (⅟₁₆ by ½ inch) discs of the glue crayons were cut and placed on a sheet of paper. The discs were then placed in an oven at 30° C., equilibrated wherein the temperature was increased slowly over time. The melting point of the crayon determined and was defined as the temperature at which the polymer started to melt and flow.

(6) Inherent viscosities were determined on a Schott-Gerate GmbH Viscometer, P.O.-TRACH 1130, D6238 Hofheim a. Ts. West Germany, via ASTM D2857-87 at 26.0I0.5° C. in toluene.

General Procedure for Polymer Preparation and Glue Crayon Preparation

A general proceedure used to prepare the polymers and the resultant, glue crayons is as follows. Generally, the polymers were prepared in solvent at 35% monomers with a polymerization temperature that varied from 60° C., for the majority of the polymers, to 80° C. for those polymers containing pentacontyl acrylate. The polymers were dried to 100% solids in a forced air oven at 60° C. for approximately 24 hours and then at 120° C. for approximately 4 hours. When toluene was used as the polymerization solvent, the final drying temperature was 140° C. The dried, hot polymers were poured into 1.26 ×6.3 cm circular molds lined with release liner paper and allowed to cool to room temperature. The glue crayons were removed and labeled.

General Polymer Preparation—Method A

Example No. 2:33.3:46.7:20:0.5 Weight Ratio ODA:SMA:IBOA:AA Glue Crayon Polymer: To a 5 liter resin flask equipped with a mechanical stirrer, a thermometer, an IR$^2$ Therm-o-watch, a N$_2$ inlet, a bubbler and a reflux condenser was added 382.48 g. ODA at 61% in EtOAc, 326.69 g. SMA, 140.00 g. IBOA, 3.50 g. AA and 1150.83 g. heptane. The agitation and a moderate N$_2$ purge were started and the reaction mixture heated to 65° C. At temperature, 0.5000 g. of 2,2'-azobisisobutyronitrile (VAZO-64) was added and the N$_2$ purge reduced to a slow bubbling rate. Fifteen and one half(15.5) hours later, the reaction mixture was heated to 80° C. and an additional 0.3500 g of 2,2'-azobisisobutyronitrile was added. Four hours later the reaction mixture was cooled to room temperature.

General Polymer Preparation- Method B

All of the polymers in the following tables were prepared at 35% monomers with 0.5000 wt. % VAZO-64, based on total monomers, using polymerization Method B, unless stated to the contrary.

Example No. 1:6.43:93.45:0.13 weight ratio IBOA:SMA:MAA polymer. A pint bottle was charged with 5.14 g. IBOA, 74.75 g. SMA, 0.10 g. methacrylic acid (MAA), 100.00 g n-heptane, 20.00 g. ethyl acetate and 0.4000 g VAZO-64. Oxygen was removed from the reaction mixture by bubbling N$_2$ rapidly through the solution for 45 seconds. The bottle was sealed with a Teflon lined cap and then placed in an Atlas Launder-o-meter at 60° C. for 16 hours. The solvent was removed, as described above, and the hot polymer poured into a mold and allowed to cool to form the glue crayon.

Examples 2–9

Acrylate Polymers

Table 1 shows the preferred acrylate polymers which have acceptable writability, adhesion and open times. Polymer Nos. 2, 3, 5 and 6 are particularly preferred polymers in that they all tore paper. As shown in Table 1, those acrylate polymers that had single DSC melting endotherms with melting points ($T_m$'s) between 34–35 and up to 38° C. demonstrated the best glue crayon properties at room temperature. When the $T_m$'s were greater than 38° C., as those shown in Table 2, the polymers were become harder and did not function as well as glue crayons. When the $T_m$'s were below 32°–33° C., the polymers were starting to become too soft to work as glue crayons at room temperature.

Examples 10–19

Tackified Acrylate Polymers

The acrylate polymers listed in Table 2 were prepared via polymerization Method B and had $T_m$'s greater than 38° C.; a few polymers with lower $T_m$'s are included in the table for comparision reasons, Examples 2, 3 and 4 from Table 1, to demonstrate the trends and benefits of the added tackifiers.

The general proceedure for preparing the tackified glue crayons was as follows. Tackifiers such as Foral-85, Foral-AX or the preferred, Piccolyte HM-90, all available from Hercules Inc. were added at the appropriate level to the previously dried acrylate polymer. This mixture was reheated with stirring and the hot composition poured into 1.26 ×6.3 cm circular molds lined with release liner paper and cooled to form the crayons. Conversely, the tackifier could have been added to the acrylate polymer in solution and the solvent removed from the mixture as described previously and then poured into the mold.

In Table 2, it was observed that those Table 1 acrylate polymers with $T_m$'s between 33°–35° C., Examples 2, 3 and 4 had good 90° peel adhesion values. When 20–30 % tackifier is added to these, the adhesion values decreased substantially that indicated overtackification. Conversely, it was observed that the addition of 10% tackifier to those polymer with $T_m$'s ranging from 35 to about 38° C. (Examples 3 and 17) improved adhesive performance to the point that they tear paper. Polymers with $T_m$'s ranging from 38.1 to about 40° C. used about 20% tackifier (Examples 11, 13, 14, 18 and 19) to tear paper. Polymers with $T_m$'s from about 40.0° to about 42.6° C. used 30% tackifier and those polymers with higher $T_m$'s (Example 16) tended to use higher levels of tackifiers (40–60%) in order to get the compositions to tear paper. The most preferred compositions were defined as those that would tear paper or pull the fiber from the paper within 2 to 2.5 minutes to 1–2 hours of application. Examples of these that met the 2–2.5 minutes paper tear were compositions 3 and 17 with 10% tackifier, compositions 13, 18 and 19 with 20% tackifier and 10, 11, 14 and 15 with 30% tackifier. A number of the glue crayons had good 90° peel adhesion values but they did not tear paper. Examples 13, 18 and 19 at 30% tackifier provided good adhesion for a number of less demanding applications that didn't require paper tear. The writability and open-times of some of the examples were not included in Table 2 because they followed the 90° peel data, that is, good peel adhesion correlated with good open times and writability.

Examples 20–41

Hydroxy-terminated Telechelic Polymers

The general proceedure for preparing the macromers used in this invention consisted of first making the hydroxy-terminated telechelic prepolymers, listed in Table 3, and then the latter were functionalized using acryloyl chloride(ACl), methacryloyl chloride(MACl), 2'-isocyanatoethyl methacrylate(IEM), 3-isopropenyl-alpha, alpha-dimethylbenzyl isocyanate(IPDMBI) and the like. In addition, because of the free radical approach used to make these telechelic prepolymers, a homopolymer as well as the hydroxy-terminated telechelic prepolymers was generated.

Example 23a in Table 3 demonstrated the preparation of an ODA hydroxy-terminated, telechelic prepolymer with a calculated molecular weight of approximately 11,000 (designated as ODA~11,000mac-OH) via polymerization Method B and is as follows: Octadecyl acrylate (114.75 g at 61% in ethyl acetate), 0.35 g acrylic acid (AA), 0.35 g mercaptoethanol (ME), 0.3500 g VAZO-64 and 85.25 g of heptane were placed in a 16 oz. bottle. Oxygen was removed from the mixture by rapidly bubbling nitrogen beneath the surface for 45 seconds. The bottle was sealed with a Teflon lined cap and placed in a water bath (Launder-o-meter) at 65° C. for 16 hours. The bottle was removed, cooled to room temperature and the telechelic prepolymer removed.

Other ODA hydroxy-terminated telechelic prepolymers with calculated molecular weights of approximately 2500, 5000, 7500 and 20,000 g/mole were prepared in the same manner and are shown in Table 3, Examples 20, 21, 22 and 28 respectively. Examples 23c through 27 demonstrated telechelic polymers with varying amounts of ODA homopoymer therein. The amount of the telechelic polymer increased as the amount of ME increased and the initiator decreased. Behenyl acrylate(BeA) hydroxy-terminated telechelic prepolymers with calculated molecular weights of approximately 4500 and 11,000 g/mole were also prepared in a similar manner (Examples 29 and 30). In addition, combinations of the above and similar monomers such as HDA, TDA and the like would be within the scope of those monomers that would be useful herein.

Examples 31–41

Macromer Polymers

The hydroxy-terminated telechelic polymers were functionalized by reaction with acryloyl chloride(ACl), methacryloyl chloride(MACl), 2'-isocyanatoethyl methacrylate(IEM), 3-isopropenyl-alpha, alpha-dimethylbenzyl isocyanate(IPDMBI) and the like as demonstrated by the following examples.

Example 33 demonstrated the preparation of an ODA~11,000 macromer from its corresponding ODA hydroxy-terminated telechelic prepolymer with a calculated molecular weight of approximately 11,000 and acryloyl chloride. Triethyl amine (2.00 g) was added to 380.00 g of the hydroxyl terminated octadecyl acrylate telechelic prepolymer (Example 23a) with stirring at room temperature. The mixture was heated to 28° C. to help dissolve the latter. When the solution was clear, the heat was turned off and 1.72 g of acryloyl chloride was added dropwise. A precipitate formed immediately and a slight exotherm to 41° C. followed. The reaction mixture was stirred for three hours, then heated to 45° C. for one hour and cooled to room temperature. The solution was extracted with 100, 50 and 50 ml aliquots of distilled water, then dried over anhydrous magnesium sulfate and filtered to yield the final ODA~11,000 macromer.

If one of the isocyanates were used, a standard catalyst such as dibutyl tin dilaurate and the like could be used as demonstrated by Example 34 which follows. To 243.13 g. of melted ODA~11,000, hydroxy terminated, telechelic prepolymer (Example 23b) (0.0080 equivalents hydroxy functionality) was added 1.14 g IEM(0.0074 equivalents NCO) and 0.0020 g DBTDL (0.17 wt. % based on IEM). The mixture was heated to and maintained at 70° C. overnight (~16 hours) and cooled. This ODA~11,000 macromer had an inherent viscosity (I.V.) in toluene of 0.1046.

Another example of a macromer prepared from a different isocyanate is demonstrated in Example 35. To 318.13 g of melted ODA~11,000, hydroxy terminated, telechelic prepolymer (Example 23c) (0.0105 equivalents hydroxy functionality) prepared via Method A was added 2.00 g IPDMBI (0.0096 equivalents NCO) and 0.0020 g DBTDL (0.1 wt. % based on IPDMBI) The mixture was heated to and maintained at 70° C. overnight (~16 hours) and cooled. This ODA~11,000 macromer had an inherent viscosity (I.V.) in toluene of 0.0785.

Other examples of the telechelic prepolymers and the resultant functionalized macromers, just described, are shown in Table 3.

These macromers were encorporated into glue crayon polymers as demonstrated by the following examples and those in Tables 4a and 7a.

Examples 42–69

Macromeric/Acrylate Polymers

The macromers, described above, were incorporated into glue crayon polymers using either polymerization Method A or Method B. The following examples demonstrate the proceedures used. Table 4a shows representitive polymers of this class and their glue crayon properties are shown in Table 4b.

Example 53 represents a 25.33:46.67:20:0.5:8 weight ratio ODA:SMA:IBOA:AA:ODA~11,000mac polymer prepared using method B. An 8 ounce bottle was charged with 10.37 g ODA at 61% in EtOAc, 11.67 g SMA, 5.00 g IBOA, 0.13 g AA, 7.46 g ODA~1,000mac at 26.8% in n-heptane, 36.92. n-heptane and 0.1200 g VAZO-64. Oxygen was removed from the reaction mixture by bubbling $N_2$ rapidly through the solution for 45 seconds. The jar was sealed with a Teflon lined cap and then placed in an Atlas Launder-o-meter at 65° C. for 16 hours. The jar was removed, cooled and the solvent removed. The hot polymer was poured into a mold and allowed to cool to form the crayon.

The improved temperature stability of these macromeric/acrylate polymers can be seen in Table 4b. Improved stability (as compared to examples summarized in Table 1 ) was confirmed by the DSC that showed the higher melting peaks of these macromeric polymer units. The percentage of the total heats of fusion that these macromeric units contributed to the polymers are shown in the Table 4b. Polymers with higher amounts of macromer demonstrated higher percentages of the total heat of fusion and had higher temperature stability as depicted by the melt and flow temperatures. For ODA, higher macromer molecular weights also seemed to contribute to more stable crayons, See Table 4a & 4b, Examples 42 vs. 46 vs. 51 vs. 56. As the macromer levels in the polymers increased, so did the writability and temperature stability; however the finger tack and adhesion decreased somewhat. Decreasing the overall molecular weights of the total polymers improved the writability and decreased the tack and adhesion. The ODA~11,000 mac provided better writability and better finger tack then the other ODA macromeric glue crayon polymers.

Glue crayon polymers using the BeA macromers are shown in Table 5a and their properties are shown in Table 5b. Their inclusion improved the glue crayon temperature stability up to 67°–69° C. And at higher levels, see Example 73, the writability of the crayon started to decrease indicating that an upper limit may have been approached for this macromer.

Examples 74–95

Acrylate Polymers with High Chain-Length Alkyl Acrylates

Glue crayon polymers which exhibit higher temperature stability are exemplified by those polymers containing the high chain-length alkyl acrylate monomers. Their preparation is exemplified by Example 83 in Table 6a which is a 20:51:20:0.5:9 weight ratio ODA:SMA:IBOA:AA:PCA. An eight ounce bottle was charged with 8.20 g ODA at 61% in EtOAc, 12.75 g SMA, 2.25 g PCA, 5.00 g IBOA, 0.13 g AA, 43.23 g toluene and 0.1250 g VAZO-64. The reaction mixture was cleared of oxygen by bubbling $N_2$ rapidly through the solution for 45 seconds. The bottle was sealed with a Teflon lined cap and then placed in an Atlas Laundero-meter at 80° C. for 16 hours. The solvent was removed and the hot polymer poured into a mold. In subsequent reactions the PCA was pre-dissolved in the toluene by heating to 100° C.; on cooling below 75° C. it would start to crystallize.

The compositions of similar high chain-length alkyl acrylate polymers are shown in Table 6a. The improved temperature stability of these polymers is shown in Table 6b. Therein it can be seen that the melt flow temperatures of Examples 74 to 86 were much greater than the 29°–35° C. temperature of their corresponding base polymer not containing the higher alkyl acrylate (Table 1, Example 2) or the <29° C. for the control polymer (Table 1, Example 4) for Examples 88 thru 95. Also note the higher melting peaks shown by the DSC and the percentages of the total heats of fusion that these peaks contributed to the polymer and hence higher temperature stability. Of the monomers evaluated, the longer alkyl chain length monomer (PCA) provided better temperature stability to the crayons than the TCA monomer—compare Examples 74–76 with Examples 82 through 95. As these higher chain-length alkyl acrylate monomer levels increased, so did the writability and temperature stability; however the finger tack and adhesion did decrease somewhat. A number of the crayon examples in Tables 6a and 6b are noted as not tearing paper. For most of these, longer times (>10 minutes) to re-crystallize, they would tear paper.

Examples 96–126

Macromeric/Acrylate Polymers with High Chain-Length Alkly Acrylate Monomers

Glue crayon polymers which demonstrate excellent writability, excellent tack, 21°–49° C. melt stability and greater than 60° C. flow stability are exemplified by the macromeric/acrylate polymers which also contain the high chain-length alkyl acrylate monomers just described.

Example 98, shown in Tables 7a & 7b, is a 15.55:46.64:15.55:0.5:13.80:8 weight ratio ODA:SMA:IBOA:AA:ODA~11,000 mac:PCA polymer and represents these polymers. Preparation of the polymer via method A was as follows: To a 1 liter split resin flask equipped with a mechanical stirrer, a thermometer, an $IR^2$ Therm-o-watch, a $N_2$ inlet, a bubbler and a reflux condenser were added 31.23 g ODA at 61% in EtOAc, 57.13 g SMA, 19.05 g IBOA, 0.61 g AA, 0.61 g IOTG, 50.43 g of ODA~11,000mac at 33.51% in EtOAc/heptane solvent, 9.80 g PCA and 180.80 g toluene. The stirring and a rapid $N_2$ purge were started. After 2–3 minutes, the $N_2$ purge was reduce to a slow rate and the solution heated to 85° C. After all of the CPA dissolved the temperature was reduced to 80° C. and 0.6125 g VAZO~64 was added. Four hours later, 0.0600 g of VAZO-64 was added and the reaction was stopped 1.5 hours later and allowed to cool to room temperature. Irganox 1010 (0.1229 g) and 0.1229 g Cyanox LTPD were added with stirring. The polymer solution was poured into aluminium pans and dried in a forced air oven at 90°, 100°, 110°, 120° and 130° C. for 2 hours at each temperature. A small amount of the polymer at the final temperature was poured into a crayon mold to form the final glue crayon.

Other polymers were prepared via the above method or via polymerization Method B and are shown in Tables 7a & 7b. The effect of the high chain-length alkyl groups on the polymer properties is demonstrated in Examples 96 through 99 that showed the polymer melt/flow temperatures increased as the levels of the high chain-length alkyl acrylate increased. A level of the PCA between 4 and 6% provided sufficient higher temperature flow stability to the glue crayon polymers.

Examples 127–142

Crystalline Additives/Acrylate Polymers

The general proceedure for preparing a crystalline additive/glue crayon was to combine the two ingredients at room temperature and then mix and heat them to around 120°–140° C. When clear and homogeneous, the mixture was poured hot into release lined molds and the latter allowed to cool to room temperature.

The effect of various types of additives on the glue crayon's thermal stability, writability, finger tack and paper adhesion is summarized in Table 8. Therein, one can see that as the melting temperature of the crystalline additive increased, so did the melt/flow temperature of the corresponding glue crayon compositions. Most of these crystalline additive/glue crayons tore paper within 2 minutes and some tore at 1 day. Those that did not tear paper right away gave indications of tearing paper at 24 hours via the picking mode, see Examples 135–137.

Examples 143–159

Unilin 550 Crystalline Additive to Acrylate Polymers

Tables 9a and 9b demonstrate the effect of one of the more preferred, crystalline additives—Unilin 550—on the acrylate polymers of this invention. Examples 143 through 145 show the concentration effect of Unilin 550 on melt and flow temperature, writability, tack and paper tear; the former increased with increasing concentrations while the rest decreased. A molecular weight effect of the polymer is seen in Examples 146–148 where the lower molecular weight polymer with 0.5% IOTG had better writability, equivalent finger tack and poorer paper tear than the same polymer at a higher molecular weight (0.1% IOTG). Examples 156–159 show polymers prepared from ODA~11,000 mac which had been prepared with different functionalizing reagents.

Comparative Examples

Similar products were prepared using typical hot-melt adhesive approaches, such as tackifing ethylene:vinyl acetate (EVA) polymers or adding waxes to polyisobutene. These approaches are in the patent art and they gave inferior glue crayons in that the adhesive was not easily deposited and/or the adhesive performance was not acceptable (temperature stability was not assessed).

Glue crayons were prepared for comparison from polyisobutene (U.S. Pat. No. 5,331,023 Examples E1, E2, E6, E8, E10, E17, E21–E23, E25, and E28) and from tackified ethylene vinyl acetate (EVA) (European Patent Application No. 0 340 990 A2). A lot of work was carried out with tackified EVA as glue crayons and the latter patent served as the starting point. Glue crayon compositions were prepared which would tear paper, which were writable or were tacky; however, all of these desirable attributes were never achieved in one crayon composition. Glue crayons prepared via 5,331,023 from polyisobutene were very similar to the EVA systems with the exception that the highest writability rating achieved was only 2.75. A number of these crayons had tack values of 5; however their corresponding writability rating were 0's and 1's. As formulated, these polyisobutene glue crayons had poor writability and it was very hard to coat the surface of the paper substrate evenly (see Table 10).

TABLE 1

Acrylate Glue Crayon Polymers

| | Polymer Compositions Weight Percent of Monomers | | | | Polymer/Crayon Performance | | | | |
|---|---|---|---|---|---|---|---|---|---|
| Example | ODA | SMA | IBOA | MAA or AA | DSC $T_m^1$ (°C.) | $dH^2$ (J/g) | Writability ($10^{-3}$/1.3 cm) | Paper Tear[3] Yes/No | 90° Peel (g/1.3 cm) |
| 2 | 33.33 | 46.67 | 20 | 0.5 | 34 | 51 | 31.5 | YES | 155 |
| 3 | 28 | 60 | 12 | 0.5 | 38 | 47 | 24.8 | YES | 184 |
| 4 | 20 | 60 | 20 | 0.5 | 33, 25 | 46 | high[4] | No | high |
| 5 | 40 | 40 | 20 | 0.5 | 35 | 44 | — | YES | 95 |
| 6 | 24 | 64 | 12 | 0.5 | 36 | 37 | — | YES | 130 |
| 7 | 22 | 62 | 16 | 0.5 | 34, 25 | 19, 5 | — | — | 39 |
| 8 | 64 | — | 36 | 0.5 | 37, 27 | 37, | — | No | 310 |
| 9 | 60 | — | 40 | 0.5 | 36, 28 | 7, 19 | — | No | 390 |

[1]Melting temperature rounded off to nearest integer
[2]Heat of Fusion rounded off to nearest integer
[3]Paper tear during 90° Peel Adhesion test
[4]Soft polymer

TABLE 2

Tackified Acrylate Polymer Glue Crayons

| | Polymer Compositions Weight Percent of Monomers | | | | Polymer/Crayon Performance Performance Tests | | | | |
|---|---|---|---|---|---|---|---|---|---|
| | | | | | $T_m$ °C. | 90° Peel vs. Percent Tackifier (g/1.3 cm)[1] | | | |
| Example | ODA | SMA | IBOA | MAA | 0% Tackifier | 0% | 10% | 20% | 30% |
| 10 | 60 | 25.33 | 14.67 | 0.5 | 40.0 | 0 | 0 | 0 | 185/Yes |
| 2 | 33.33 | 46.67 | 20 | 0.5 | 33.5 | 155/Yes | 110/No | liquid | liquid |
| 11 | 60 | 20 | 20 | 0.5 | 38.7 | 0 | 0 | 62/Yes | 317/Yes |
| 3 | 28 | 60 | 12 | 0.5 | 37.9 | 184/Yes | 228/Yes | liquid | liquid |
| 12 | 52 | 44 | 4 | 0.5 | 42.1 | 0 | 0 | 0 | 19/Yes |
| 13 | 52 | 32 | 16 | 0.5 | 38.2 | 0 | 0 | 103/Yes | 209/No |
| 14 | 36 | 60 | 4 | 0.5 | 40 | 0 | 0 | 27/Yes | 29/Yes |
| 4 | 20 | 60 | 20 | 0.5 | 32.9 | big[2] | liquid | liquid | liquid |
| 15 | 60 | 30.67 | 9.33 | 0.5 | 42.6 | 0 | 0 | 0 | 71/Yes |
| 16 | 60 | 36 | 4 | 0.5 | 43.4 | 0 | 0 | 0 | 0 |
| 17 | 46.67 | 33.33 | 20 | 0.5 | 36.2 | 5 | 161/Yes | 162/No | liquid |
| 18 | 44 | 44 | 12 | 0.5 | 39.1 | 0 | 0 | 186/Yes | 250/No |
| 19 | 40 | 52 | 8 | 0.5 | 38.6 | 0 | 0 | 106/Yes | 346/No |

[1]Yes or No indicates whether or not the paper delaminated occurred during the test at 2 minutes
[2]Value was greater than 300

TABLE 3

Telechelic and Macromer Polymers

| | Telechelic Prepolymers[1] | | | | Macromer Polymers | |
|---|---|---|---|---|---|---|
| Example | Monomers | Wt. % ME | Wt. % Initiator[3] | Calc'd Mol. Wt. | Example | Capping Agent |
| 20 | ODA | 4.0000 | 0.5000 | 2500 | 31 | ACl |
| 21 | ODA | 2.0000 | 0.5000 | 5000 | 32 | ACl |
| 22 | ODA | 1.0000 | 0.5000 | 7500 | — | — |
| 23a | ODA | 0.5000 | 0.5000 | 11,000 | 33 | ACl |
| 23b[2] | ODA | 0.5000 | 0.5000 | 11,000 | 34 | IEM |
| 23c[2] | ODA | 0.5000 | 0.5000 | 11,000 | 35 | IPDMBI |
| 24 | ODA | 0.5971 | 0.4000 | 11,000 | 36 | ACl |
| 25 | ODA | 0.6923 | 0.3000 | 11,000 | 37 | ACl |
| 26 | ODA | 0.7874 | 0.2000 | 11,000 | 38 | ACl |
| 27 | ODA | 0.8826 | 0.1000 | 11,000 | 39 | ACl |
| 28 | ODA | 0.5000 | 0.1000 | 20,400 | 40 | ACl |
| 29 | BeA | 2.0000 | 0.5000 | 4500 | — | — |
| 30 | BeA | 0.5000 | 0.5000 | 11,400 | 41 | ACl |

[1]35% in 53.85:85.25 EtOAc:Heptane
[2]Made in the same mannner as 23a
[3]VAZO-64

TABLE 4a

Octadecyl Acrylate Macromer/Acrylate Glue Crayons Polymers

| | Weight Percent Monomers[1] | | | | | | |
|---|---|---|---|---|---|---|---|
| | | | | ODA Macromer - calc'd Mol. Wt. | | | |
| Example | ODA | SMA | IBOA | 2500 | 5,000 | 11,000 | 20,000 |
| 42 | 31.3 | 46.7 | 20 | 2 | | | |
| 43 | 29.3 | 46.7 | 20 | 4 | | | |
| 44 | 25.3 | 46.7 | 20 | 8 | | | |
| 45 | 17.3 | 46.7 | 20 | 16 | | | |
| 46 | 31.33 | 46.7 | 20 | | 2 | | |
| 47 | 29.33 | 46.7 | 20 | | 4 | | |
| 48 | 25.33 | 46.7 | 20 | | 8 | | |
| 49 | 29.8 | 41.8 | 17.9 | | 10 | | |
| 50 | 32.3 | 46.7 | 20 | | | 1 | |
| 51 | 31.3 | 46.7 | 20 | | | 2 | |
| 52 | 29.3 | 46.7 | 20 | | | 4 | |
| 53 | 25.3 | 46.7 | 20 | | | 8 | |
| 54 | 29.8 | 41.8 | 17.9 | | | 10 | |
| 55 | 32.3 | 46.7 | 20 | | | | 1 |
| 56 | 31.3 | 46.7 | 20 | | | | 2 |
| 57 | 29.3 | 46.7 | 20 | | | | 4 |
| 58 | 17.9 | 53.7 | 17.9 | | | | 10 |
| 59 | 16.9 | 50.7 | 16.9 | | | | 15 |
| 60 | 15.9 | 47.7 | 15.9 | | | | 20 |
| 61 | 18 | 60 | 20 | 2 | | | |
| 62 | 16 | 60 | 20 | 4 | | | |
| 63 | 12 | 60 | 20 | 8 | | | |
| 64 | 4 | 60 | 20 | 16 | | | |
| 65 | 18.9 | 56.7 | 18.9 | | 5 | | |
| 66 | 17.9 | 53.7 | 17.0 | | 10 | | |
| 67 | 16.9 | 50.7 | 16.9 | | 15 | | |
| 68 | 18.9 | 56.7 | 18.9 | | | 5 | |
| 69 | 17.9 | 53.7 | 17.9 | | | 10 | |

[1]All polymers contained 0.50 wt. % AA, 0.50 wt. IOTG and used 0.5000 wt. % VAZO-64.

TABLE 4b

Polymer Properties

| Example | DSC Data Highest Temp (°C.) | DSC Data Peak(s) % dH[1] (J/g) | 90° Peel Adhesion (g/1.3 cm) | Writability[2] (1–5) | Qualitative Data Finger Tack[2] (1–5) | Tear Paper (4a)[3] (Y/N) | Melts & Flows[4] (°C.) |
|---|---|---|---|---|---|---|---|
| 42 | — | — | 41/N | 5 | 3.5 | Y | 33–39 |
| 43 | — | — | 171/Y | 4 | 4 | Y | 39–45 |
| 44 | — | — | 175/N | 5 | 3 | Y | 43–45 |
| 45 | — | — | 70/N | 3.5 | 2.5 | Y | 46–48 |
| 46 | 40.8s | — | 112/N | 5 | 4 | Y | 37–42 |
| 47 | 39.2s | 7.1 | 86/N | 5 | 2 | Y | 42–46 |
| 48 | 43.6 | 15.9 | 87/N | 4.5 | 3.5 | Y | 46 |
| 49 | — | — | 12/N | 4 | 1.5 | N | 42–46 |
| 50 | 47.3 | | 152/Y | 4.5 | 4 | Y | 35–37 |
| 51 | — | — | 184/Y | 4 | 4 | Y | 42–46 |
| 52 | 47.6 | 7.7 | 149/N | 4 | 4.5 | Y | 42–46 |
| 53 | — | — | 74/N | 4.5 | 2 | Y | 46–50 |
| 54 | — | — | 136/N | 4 | 2 | N | 42–46 |
| 55 | 47.7 | 0.5 | — | 4 | 4.5 | Y | 35–39 |
| 56 | 39.0, 47.4 | 3.9 | — | 4 | 4.5 | Y | 48–50 |
| 57 | 38.8, 47.3 | 8.7 | — | 4 | 4.5 | Y | 50–51 |
| 58 | 39.2, 47.9 | 33.6 | — | 5 | 4 | N | 50 |
| 59 | 39.9, 48.4 | 42.2 | — | 5 | 3 | N | 51 |
| 60 | 40.2, 48.5 | 52.5 | — | 4 | 2 | N | 50–51 |
| 61 | — | — | 257/N | 2.5 | 5 | Y | 33–41 |
| 62 | — | — | 437/N | 2 | 5 | Y | 36–37 |
| 63 | — | — | 534/N | 2.5 | 5 | Y | 39–46 |
| 64 | — | — | 735/N | 2 | 4 | Y | 46–48 |
| 65 | 34.1 | 22.2 | 139/N | 4 | 5 | Y | |
| 66 | | | 113/N | 5 | 3 | Y | 42–46 |
| 67 | | | 36/N | 4.5 | 2 | N | 42–46 |
| 68 | 40.9, 48.4 | 19.7 | 101/N | 4 | 4.5 | Y | 42–46 |
| 69 | | | 151/N | 3 | 3 | Y | 42–46 |

[1]The highest peaks percentage of the total dH
[2]Scale: 1–5, 5 = best
[3]Tear paper or pull paper fibers - Yes or No; Method used in ( )
[4]Temperature that polymer melts and flows TABLE 5a Behenyl Acrylate Macromer/Acrylate Glue Crayons Polymers

| | Weight Percent Monomers[1] | | | |
|---|---|---|---|---|
| Example | ODA | SMA | IBOA | BeA~11,000 mac |
| 70 | 19.1 | 57.3 | 19.1 | 4 |
| 71 | 18.3 | 54.9 | 18.3 | 8 |
| 72 | 17.5 | 52.5 | 17.5 | 12 |
| 73 | 15.7 | 50.1 | 15.7 | 16 |

[1]All polymers contained 0.50 wt. % AA, 0.50 wt. IOTG and used 0.5000 wt. % VAZO-64.

TABLE 5b

Polymer Properties

| | DSC Data | | Qualitative Data | | | |
|---|---|---|---|---|---|---|
| Example | Highest Temp (°C.) | Peak dH % | Writability (1–5)[2] | Finger Tack (1–5)[2] | Tear Paper (4a)[3] (Y/N) | Melts/ Flows[4] (°C.) |
| 70 | 64.7 | 6.5 | 4 | 5 | N | 64–66 |
| 71 | 64.1 | 13.0 | 4 | 5 | Y | 67–71 |
| 72 | 65.0 | 20.1 | 4 | 5 | N | 67–69 |
| 73 | 64.9 | 26.7 | 3.5 | 5 | Y | 67–69 |

[2]Scale: 1–5, 5 = best
[3]Tear paper or pull paper fibers - Yes or No; Method used in ( )
[4]Temperature that polymer melts and flows TABLE 6a Higher Chain Length Alkyl Acrylate Glue Crayons Polymers Weight Percent Monomers[1]

| | | | | Higher Alkyl Acrylates | | |
|---|---|---|---|---|---|---|
| Example | ODA | SMA | IBOA | TrCA | TCA | PCA |
| 74 | 20 | 48 | 20 | 12 | | |
| 75 | | 60 | 20 | 20 | | |
| 76 | | 70 | 20 | 10 | | |
| 77 | 20 | 57 | 20 | | 3 | |
| 78 | 20 | 54 | 20 | | 6 | |
| 79 | 20 | 51 | 20 | | 9 | |
| 80 | 20 | 48 | 20 | | 12 | |
| 81 | 20 | 44 | 20 | | 16 | |
| 82 | 20 | 54 | 20 | | | 6 |
| 83 | 20 | 51 | 20 | | | 9 |
| 84 | 20 | 48 | 20 | | | 12 |
| 85 | 18 | 49.5 | 22 | | | 10 |
| 86 | 22 | 49.5 | 18 | | | 10 |
| 87 | 19.33 | 46.83 | 19.33 | | | 14 |
| 88 | 18 | 45.5 | 22 | | | 14 |
| 89 | 18 | 48.17 | 20.67 | | | 12.67 |
| 90 | 20.67 | 48.17 | 18 | | | 12.67 |
| 91 | 22 | 46.83 | 19.33 | | | 11.33 |
| 92 | 18.96 | 49.88 | 19.71 | | | 10.96 |
| 93 | 22 | 45.5 | 18 | | | 14 |
| 94 | 18.5 | 51.17 | 18 | | | 11.83 |
| 95 | 22 | 45.5 | 22 | | | 10 |

[1] All polymers contained 0.50 wt. % AA, 0.50 wt. % IOTG and used 0.5000 wt. % VAZO-64.

TABLE 6b

Polymer Properties

| | DSC Data | | Qualitative Data | | | |
|---|---|---|---|---|---|---|
| Example | Highest Temp (°C.) | Peak(s) % dH[1] (J/g) | Writability (–5)[2] | Finger Tack (1–5)[2] | Tear Paper (4a) (Y/N)[3] | Melts/ Flows (°C.)[4] |
| 74 | 27.44 | — | 4 | 3 | Y | 35–37 |
| 75 | — | — | 2.5 | 5 | Y | 50–55 |
| 76 | — | — | 1.5 | 5 | N | 35–47 |
| 77 | — | — | 4.5 | 5 | N | — |
| 78 | — | — | 4.5 | 5 | Y | — |
| 79 | — | — | 4.5 | 5 | Y | — |
| 80 | — | — | 4 | 5 | Y | — |
| 81 | 72.6 | 17.7 | 3 | 3.5 | Y | — |
| 82 | 106.9 | 8.52 | 4.5 | 5 | Y | 66–>70 |
| 83 | 102.8, 108.2 | 11.2 | 5 | 3 | Y | >66– |
| 84 | 103.2, 108 | 15.4 | 4.5 | 4.5 | Y | 66–>70 |
| 85 | 102.6, 108.5 | 15.7 | 2.8 | 4.8 | N(Y@ 10 min.) | 95–>105[5] |
| 86 | 103.2, 109.6 | 8.5 | 1.8 | 4.3 | Y | 95–>105[5] |
| 87 | 103.9, 109.7 | 13.3 | 2.75 | 4.25 | Y | >105[6] |
| 88 | 104.2, 109.6 | 13.5 | 1.8 | 4.4 | Y | 102–>105[6] |
| 89 | — | — | 2 | 4.5 | Y | >105[6] |
| 90 | 103.6, 108.9 | 11.4 | 2.5 | 4.25 | Y | 102–>105[5] |
| 91 | 103.5, 109 | 8.0 | 1.7 | 3.9 | Y | 95–>105[5] |
| 92 | 103.2, 108.9 | 12.9 | 2 | 4 | Y | 95–>105[5] |
| 93 | 103.2, 109.0 | 14.3 | 2.25 | 3.5 | N(Y@ 10 min.) | >105[6] |
| 94 | 104.4, 110.3 | 10.5 | 1.75 | 4.5 | Y | 102–>105[5] |

TABLE 6b-continued

| | Polymer Properties | | | | |
|---|---|---|---|---|---|
| | DSC Data | | Qualitative Data | | | |
| Example | Highest Temp (°C.) | Peak(s) % dH[1] (J/g) | Writability (–5)[2] | Finger Tack (1–5)[2] | Tear Paper (4a) (Y/N)[3] | Melts/ Flows (°C)[4] |
| 95 | 103.5, 109.6 | 8.1 | 1.8 | 4 | Y | 95–102[5] |

[1]The highest peaks percentage of the total dH
[2]Scale: 1–5, 5 = best
[3]Tear paper or pull paper fibers - Yes or No; Method used in ( )
[4]Temperature that polymer melts and nows
[5]All samples wet the paper at 63–66° C., their surfaces became smooth at 85° C. and none really flowed through 100° C.
[6]Maintained their their shape the best

TABLE 7a

Macromer/Higher Alkyl Monomers Acrylate Glue Crayon Polymers

Polymer Composition Weight Percent Monomers/Reactants[1]

| Example | ODA | SMA | IBOA | ODA–11,000 mac | PCA | IOTG |
|---|---|---|---|---|---|---|
| 96 | 16.22 | 48.67 | 16.22 | 14.44 | 4 | 0.50 |
| 97 | 15.89 | 47.66 | 15.89 | 14.10 | 6 | 0.50 |
| 98 | 15.55 | 46.64 | 15.55 | 13.80 | 8 | 0.50 |
| 99 | 17 | 43.5 | 20 | 9 | 10 | 0.30 |
| 100 | 30 | 30 | 20 | 13 | 6 | 0.50 |
| 101 | 10 | 61.67 | 11.33 | 10 | 6 | 0.50 |
| 102 | 13.5 | 50 | 20 | 10 | 6 | 0.50 |
| 103 | 11.75 | 46.75 | 20 | 15 | 6 | 0.50 |
| 104 | 23.5 | 40 | 20 | 10 | 6 | 0.50 |
| 105 | 18.5 | 40 | 20 | 15 | 6 | 0.50 |
| 106 | 8.5 | 55 | 20 | 10 | 6 | 0.50 |
| 107 | 17.8 | 44.35 | 20 | 11.35 | 6 | 0.50 |
| 108 | 21 | 40 | 20 | 12.5 | 6 | 0.50 |
| 109 | 14.33 | 42.5 | 20 | 16.67 | 6 | 0.50 |
| 110 | 7.2 | 49.63 | 20 | 16.67 | 6 | 0.50 |
| 111 | 12.5 | 49.9 | 14 | 17 | 6 | 0.15 |
| 112 | 10 | 50.4 | 16 | 17 | 6 | 0.15 |
| 113 | 15 | 46 | 16.93 | 15.47 | 6 | 0.15 |
| 114 | 13.77 | 51.33 | 15.55 | 12.75 | 6 | 0.15 |
| 115 | 15 | 50.2 | 17.2 | 11 | 6 | 0.15 |
| 116 | 13.47 | 46 | 16.93 | 17 | 6 | 0.15 |
| 117 | 15 | 53 | 14 | 11.4 | 6 | 0.15 |
| 118 | 13.33 | 51.13 | 14 | 14.93 | 6 | 0.15 |
| 119 | 13.33 | 53 | 16.07 | 11 | 6 | 0.15 |
| 120 | 13.77 | 47.83 | 18.55 | 13.25 | 6 | 0.15 |
| 121 | 15 | 47.4 | 14 | 17 | 6 | 0.15 |
| 122 | 10.1 | 49.58 | 20 | 13.3 | 6 | 0.10 |
| 123 | 10.1 | 49.58 | 20 | 13.3 | 6 | 0.50 |
| 124 | 18.7 | 44.8 | 20 | 10.00 | 6 | 0.30 |
| 125 | 14.33 | 42 | 20 | 16.67 | 6 | 0.10 |
| 126 | 23.33 | 39.67 | 20 | 10 | 6 | 0.30 |

[1]All polymers contained 0.50 wt. % AA and used 0.5000 wt. % VAZO-64.

TABLE 7b

Polymer/Glue Crayon Properties

Qualitative Data

| | Melt/Flow | Writability | Finger Tack | Tear Paper[2] (4b) | |
|---|---|---|---|---|---|
| Example | Temp. (°C.) | Scale[1] (1–5) | Scale[1] (1–5) | 70° F. (1-hour) | 70° F. (1-day) |
| 96 | 48–53 | — | — | — | — |
| 97 | 105–109 | — | — | — | — |
| 98 | 105–109 | — | — | — | — |
| 99 | 105–108 | 3.5 | 4 | Y | — |
| 100 | 96–105 | 3.3 | 4.5 | — | — |
| 101 | — | 3.9 | 2.2 | — | — |
| 102 | — | 3.85 | 3.4 | — | — |
| 103 | — | 3.6 | 4.3 | 40 | — |
| 104 | — | 3.6 | 4.3 | 20 | — |
| 105 | — | 4.5 | 4.3 | 54 | — |
| 106 | — | 4.1 | 4.2 | 37 | — |
| 107 | — | 3.5 | 4.4 | 13 | — |
| 108 | — | 3.6 | 4.3 | 40 | — |
| 109 | — | 4.3 | 4.3 | 60 | — |
| 110 | — | 3.6 | 3.8 | 70 | — |
| 111 | — | 3.2 | 4.3 | 33 | — |
| 112 | — | 4 | 4 | 75 | 85 |
| 113 | — | 2.8 | 4 | 80 | 85 |
| 114 | — | 4.1 | 4 | 50 | 85 |
| 115 | — | 4 | 3.7 | 60 | 90 |
| 116 | — | 3.7 | 3.6 | 65 | 85 |
| 117 | — | 4.1 | 3 | 7.5 | 65 |
| 118 | — | 3.3 | 3 | 75 | 90 |
| 119 | — | 3.9 | 4.3 | 75 | 98 |
| 120 | — | 4.4 | 4.8 | 75 | 100 |
| 121 | — | 4.2 | 2.7 | 55 | 45 |
| 122 | — | 2 | 4.3 | — | 100 |
| 123 | — | 3.3 | 4.3 | — | 100 |
| 124 | — | 2.9 | 4.6 | 60[3] | N-4[4] |
| 125 | — | 3.1 | 5 | 80 | 95 |
| 126 | — | 4.2 | 5 | 90 | 75 |

[1]Scale: 1–5, 5 = best;
[2]Tear paper or pull paper fibers - Yes, No or percent; test method used is ( ),
[3]2 4.5 Hours;
[4]2 Days

TABLE 8

ADDITIVES TO CRAYON POLYMERS

| Examples | Polymer | Additives Composition | Wt. % | Melt Temperature Additive (°C.) | Melt Temperature Blend (°C.) | Paper Tear (4C)[3] (2 min) | Paper Tear (4C)[3] (1 Day) |
|---|---|---|---|---|---|---|---|
| 127 | 2[1] | Stearic Acid | 20 | 68.0 | 44.1 | Y | N |
| 128 | " | Stearyl Alcohol | 25 | 60.5 | 52.6 | Y | N |
| 129 | " | Behenyl Alcohol | 20 | 74.6 | 66.2 | Y | Y |
| 130 | " | Behenic Acid | 10 | 72.5 | 67.9 | Y | Y |
| 131 | " | Calcium Stearate | 20 | 178–186 | | Y[4] | |
| 132 | " | Zinc Stearate | 20 | 130 | | Y[4] | |
| 133 | 4[2] | Behenyl Alcohol | 20 | 74.6 | 66.1 | Y | Y |
| 134 | " | C-30 Alcohol | 20 | 75.3 | 76.1 | Y | Y |
| 135 | " | BE-SQUARE-185 wax | 20 | 91.0 | 79.4 | N | Picks |
| 136 | " | BE-SQUARE-195 wax | 20 | 93.0 | 82.4 | N | Picks |
| 137 | " | CONDOR 12-HSA | 20 | 74.0 | 75.0 | N | Picks |
| 138 | " | SYNCROWAX-HC | 20 | 60–65 | 54.9 | Y | N |
| 139 | " | C24/28 alpha Olefin | 20 | 60–65 | 28.4 | Y | Picks |
| 140 | " | C-30 alpha Olefin | 20 | 70–75 | 51.6 | Y | Y |
| 141 | " | C-50 Alcohol | 10 | 102 | 102 | Y | Y |
| 142 | " | Azelaic Acid | 20 | 107 | — | Y | Y |

[1]Polymer 2, Table 1 - 33:47:20:0.5 wt. % ODA:SMA:IBOA:AA, Tm - 24.7–29.9° C.
[2]Polymer 4, Table 1 - 20:60:20:0.5 wt. % ODA:SMA:IBOA:AA, Tm - 27° C.
[3]Tear paper - Yes or No; Method used in ( )
[4]Method 4a at 5 min.

TABLE 9a

UNILIN 550 ADDITIVE TO GLUE CRAYON POLYMERS

POLYMER COMPOSITIONS
Weight Percent Monomers/ Reactants[1]

| Example | ODA | SMA | IBOA | ODA~11,000 mac | Unilin 550 | IOTG |
|---|---|---|---|---|---|---|
| 143 | 18.7 | 44.8 | 20 | 10.00 | 6 | 0.30 |
| 144 | 18.7 | 44.8 | 20 | 10.00 | 4 | 0.30 |
| 145 | 18.7 | 44.8 | 20 | 10.00 | 2 | 0.30 |
| 146 | 14.33 | 42 | 20 | 16.67 | 6 | 0.5 |
| 147 | 14.33 | 42 | 20 | 16.67 | 6 | 0.30 |
| 148 | 14.33 | 42 | 20 | 16.67 | 6 | 0.10 |
| 149 | 23.33 | 39.67 | 20 | 10 | 6 | 0.30 |
| 150 | 10 | 61.67 | 11.33 | 10 | 6 | 0.30 |
| 151 | 10 | 53 | 20 | 10 | 6 | 0.10 |
| 152 | 10.1 | 49.58 | 20 | 13.3 | 6 | 0.30 |
| 153 | 18.7 | 44.8 | 20 | 10 | 6 | 0.10 |
| 154 | 10 | 59.68 | 13.21 | 10.1 | 5 | 0 |
| 155 | 10 | 57.03 | 15.03 | 10.88 | 5 | 0.20 |
| 156 | 14.33 | 42 | 20 | 16.67[2] | 6 | 0.20 |
| 157 | 14.33 | 42 | 20 | 16.67[3] | 6 | 0.20 |
| 158 | 14.33 | 42 | 20 | 16.67[4] | 6 | 0.20 |
| 159 | 14.33 | 42 | 20 | 16.67[5] | 6 | 0.20 |

[1]All polymers contained 0.50 wt. percent acrylic acid (AA) and used 0.5000 wt. % VAZO-64.
[2]Macromer prepared using AC1
[3]Macromer prepared using IEM
[4]Macromer prepared using IPDBI
[5]Macromer added as additive after polymer synthesis TABLE 9b Polymer Properties
Polymer/Glue Crayon Properties

QUALITATIVE DATA

| Example | Melt & Flow Temperature[1] (°C.) | Writability Scale[2] (1–5) | Finger Tack Scale[2] (1–5) | Tear Paper[3] (4b) 70° F. (1 hour) | Tear Paper[3] (4b) 70° F. (1 day) |
|---|---|---|---|---|---|
| 143 | 90–94 | 4 | 4.5 | 12[3] | N-4.5[4] |
| 144 | 78–86 | 4.1 | 4.6 | 78[3] | N-4[4] |
| 145 | 50–53 | 4.6 | 4.8 | 75[3] | N-3.5[4] |
| 146 | | 3.8 | 5 | 4 | 90 |
| 147 | | 3.5 | 5 | 90 | 85 |
| 148 | | 3.4 | 5 | 80 | 85 |
| 149 | | 4.1 | 5 | 95 | 75 |
| 150 | | 4.4 | 5 | 90 | N-1 |
| 151 | | 1.2 | 5 | N-4.5 | 70 |
| 152 | | 1.3 | 5 | N-4 | 40 |
| 153 | | 2.3 | 5 | N-4 | 95 |
| 154 | | 3.8 | 4.1 | Y | 95 |
| 155 | | 3.3 | 4.5 | Y | 50 |
| 156 | | 4 | 4.5 | Y | 90 |
| 157 | | 4 | 4.5 | Y | 95 |
| 158 | | 3.5 | 4.75 | Y | 90 |
| 159 | | 3.8 | 4.5 | Y | 90 |

[1]Temperature that polymer melts and flows
[2]Scale: 1–5, 5 = best
[3]Tear paper or pull paper fibers - Yes or No, Method used in ( )

TABLE 10

Comparative Glue Crayon Properties

| Example | Example in 5,331,023 | Writability Scale (1-5) | Finger Tack Scale (1-5) | 70° F. Tear Paper (4b)[2] 1 Hour (Yes/No) | 70° F. Tear Paper (4b)[2] 1 Day (Yes/No) |
|---|---|---|---|---|---|
| C1  | E1  | 1.5 | 3 | N-2.5 | N-2.5 |
| C2  | E2  | 0   | 5 | N-2   | N-3   |
| C3  | E6  | 2   | 4 | N-3   | N-2   |
| C4  | E8  | 2   | 4 | N-2   | N-2   |
| C5  | E10 | 0[1] |   |       |       |
| C6  | E17 | 0[1] |   |       |       |
| C7  | E21 | 1   | 5 | N-3.5 | N-3   |
| C8  | E22 | 1   | 2 | N-3.5 | N-3   |
| C9  | E23 | 1   | 5 | N-4   | N-3   |
| C10 | E25 | 1.5 | 5 | N-4   | N-3.5 |
| C11 | E28 | 1.5 | 5 | N-4   | N-3   |

[1]Could not be applied
[2]Paper tear - Yes or No, Method used in

We claim:

1. A solid thermoplastic acrylate friction-activated adhesive composition comprising the mixture of:
   (a) 50-100 parts by weight of an acrylate-based adhesive polymer wherein the polymer has an inherent viscosity in toluene between 0.05-0.40 deciliters per gram and comprises:
      i. 10 to 96 pans by weight of at least one crystalline monomeric unit having an alkyl carbon length of 18-22 carbon atoms;
      ii. 0-70 parts by weight of at least one waxy, soft monomeric unit having an average alkyl carbon length of 14-17.5 carbon atoms;
      iii. 90-4 parts by weight of at least one tackifiying monomeric unit, whose homopolymer has a $T_m$ in the range of 80°-110° C.;
      iv. 0-10 parts by weight of a monomeric unit having acid functionality;
      v. 0 or 0.5-20 parts by weight of a macromeric unit having an average carbon length of 18-22; and
      vi. 0 or 2.5-20 pans by weight of at least one higher alkyl chain length acrylate monomeric unit having a carbon length in the range of 30 to 50 carbon atoms;
   (b) 0-50 pans by weight of at least one tackifier;
   (c) 0-35 pans by weight at least one crystalline additive; and
   (d) 0-50 pans by weight of at least one filler.

2. The composition of claim 1 wherein the adhesive is shaped as an adhesive crayon.

3. The composition of claim 1 wherein the adhesive is friction activated and solvent free.

4. The composition of claim 1 wherein the adhesive is composed of 20-60:0-62:12-40:0-5 weight ratio of octadecyl acrylate:stearyl methacrylate:isobornyl acrylate:acrylic acid.

5. The composition of claim 1 wherein the adhesive is composed of 28-60:20-60:4-20:0-5 weight ratio of octadecyl acrylate:stearyl methacrylate:isobornyl acrylate:(meth)acrylic acid with 5-50 wt. % tackifier.

6. The composition of claim 1 wherein the adhesive is composed of 4-34:39-60:14-28:0-5:1-20 weight ratio of octadecyl acrylate:stearyl methacrylate:isobornyl acrylate:acrylic acid:octadecyl acrylate macromer.

7. The composition of claim 1 wherein the adhesive is composed of 18-22:44-70:18-22:0-5:3-20 weight ratio of octadecyl acrylate:stearyl methacrylate:isobornyl acrylate:acrylic acid:pentacontyl acrylate.

8. The composition of claim 1 wherein the adhesive is composed of 7-30:30-62:10-20:0-5:9-17:4-10 weight ratio of octadecyl acrylate:stearyl methacrylate:isobornyl acrylate:acrylic acid:octadecyl acrylate macromer:pentacontyl acrylate.

9. A glue crayon comprising the mixture of:
   (a) 50-100 pans by weight of an acrylate-based adhesive polymer wherein the polymer an inherent viscosity in toluene between 0.05-0.40 deciliters per gram and comprises:
      i. 10 to 96 pans by weight of at least one crystalline monomeric unit having an alkyl carbon length of 18-22 carbon atoms;
      ii. 0-70 parts by weight of at least one waxy, soft monomeric unit having an average alkyl carbon length of 14-17.5 carbon atoms;
      iii. 90-4 parts by weight of at least one tackifiying monomeric unit, whose homopolymer has a $T_m$ in the range of 80°-110° C.;
      iv. 0-10 parts by weight of a monomeric unit having acid functionality;
      v. 0 or 0.5-20 parts by weight of a macromeric unit having an average carbon length of 18-22; and
      vi. 0 or 2.5-20 parts by weight of at least one higher alkyl chain length acrylate monomeric unit having a carbon length in the range of 30 to 50 carbon atoms;
   (b) 0-50 parts by weight of at least one tackifier;
   (c) 0-35 pans by weight at least one crystalline additive; and
   (d) 0-50 parts by weight of at least one filler.

10. A method of using the composition of claim 1, comprising the steps:
   (a) forming the composition of claim 1 into a pressure sensitive adhesive mass;
   (b) friction rubbing the pressure sensitive adhesive mass onto a substrate;
   wherein the friction rubbing provides an adhesive film.

* * * * *

UNITED STATES PATENT AND TRADEMARK OFFICE
CERTIFICATE OF CORRECTION

PATENT NO.:     5,604,268

DATED:          February 18, 1997

INVENTOR(S):    Neil A. Randen, John W. Frank, Patrick J. Hager

It is certified that error appears in the above-identified patent and that said Letters Patent is hereby corrected as shown below:

Title page listing of Foreign Patent Documents:
    Replace "0340440A2" with -- 0340990A2 --

Col. 4, lines 18, 54 and 55: Replace "pans" with -- parts --
    Col. 4, line 44, replace "$T_g$" with -- $T_m$ --
    Col. 5, line 27, replace "arid" with -- and --
    Col. 5, line 63, replace "ODA - 11,000mac" with -- ODA ~ 11,000mac --
    Col. 7, line 3, replace "$C_{30}$-$C_{30}$" with -- $C_{30}$-$C_{50}$ --
    Col. 7, line 36, replace "BOA:AA:ODA—11,000mac:PCA" with -- BOA:AA:ODA~11,000mac:PCA --
    Col. 11, line 35, replace "Example No. 2:33.3:46.7:20:0.5" with -- Example No. 2: 33.3:46.7:20:0.5 --
    Col. 11, line 57, replace "Example No. 1:6.43:93.45:0.13" with -- Example No. 1: 6.43:93.45:0.13 --
    Col. 14, line 44, replace "ODA~1,000mac" with -- ODA~11,000mac --
    Col. 16, line 14, replace "VAZO~64" with -- VAZO-64 --
    Col. 19, table 4a, example 66, replace "17.0" with -- 17.9 --
    Col. 23, table 6b, replace column heading "Writability $(-5)^2$" with -- Writability $(1-5)^2$ --
    Col. 23, table 6b, example 74, replace "35-37" with -- 35-47 --
    Col. 25, table 6b continued, replace column heading "Writability $(-5)^2$" with -- Writability $(1-5)^2$ --
    Col. 25, table 6b continued, footnote 4, replace "nows" with -- flows --
    Col. 27, table 8, example 131, replace "178-186" with -- 178-180 --
    Col. 4, line 45, 53 and 54 replace "pans" with --parts --

UNITED STATES PATENT AND TRADEMARK OFFICE
CERTIFICATE OF CORRECTION

PATENT NO. : 5,604,268

DATED : February 18, 1997

INVENTOR(S) : Neil A. Randen, John W. Frank, Patrick J. Hager

It is certified that error appears in the above-identified patent and that said Letters Patent is hereby corrected as shown below:

Col. 29, lines 29, 42, 45, 46 and 48, replace "pans" with –parts –
Col. 30, lines 21, 25 and 43, replace "pans" with – parts --

Signed and Sealed this

Seventh Day of March, 2000

Attest:

Attesting Officer

Q. TODD DICKINSON

Commissioner of Patents and Trademarks